(12) United States Patent
Nishimoto et al.

(10) Patent No.: US 9,851,592 B2
(45) Date of Patent: Dec. 26, 2017

(54) DISPLAY DEVICE

(71) Applicant: Japan Display Inc., Tokyo (JP)

(72) Inventors: Takuya Nishimoto, Tokyo (JP); Yuichi Tsubaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 63 days.

(21) Appl. No.: 15/057,863

(22) Filed: Mar. 1, 2016

(65) Prior Publication Data

US 2016/0259200 A1    Sep. 8, 2016

(30) Foreign Application Priority Data

Mar. 4, 2015    (JP) .................. 2015-042762

(51) Int. Cl.
*H05K 1/00*    (2006.01)
*G02F 1/1333*    (2006.01)
*G02F 1/1335*    (2006.01)

(52) U.S. Cl.
CPC .. *G02F 1/133305* (2013.01); *G02F 1/133528* (2013.01); *G02F 2001/133302* (2013.01)

(58) Field of Classification Search
USPC .................................. 361/749, 748
See application file for complete search history.

(56) References Cited

U.S. PATENT DOCUMENTS

| 2009/0091681 | A1 | 4/2009 | Nishizawa et al. |
| 2010/0110328 | A1* | 5/2010 | Tatebayashi ......... G02B 6/0091 349/58 |
| 2012/0257409 | A1* | 10/2012 | Huang ................ G02B 6/0035 362/603 |

FOREIGN PATENT DOCUMENTS

JP    2009-086560    4/2009

* cited by examiner

*Primary Examiner* — Andargie M Aychillhum
(74) *Attorney, Agent, or Firm* — K&L Gates LLP

(57) ABSTRACT

According to an aspect, a display device includes: a substrate including a pixel portion and a terminal portion that are provided on a first surface of the substrate, a flexible printed circuit board that is bonded to the terminal portion, a polarizing plate that is bonded to a region facing the pixel portion in a second surface opposite to the first surface of the substrate, a support member that is bonded to a region facing the terminal portion in the second surface, and a covering member that is bonded to the polarizing plate and the support member.

10 Claims, 3 Drawing Sheets

DISPLAY DEVICE

CROSS-REFERENCE TO RELATED APPLICATIONS

This application claims priority from Japanese Application No. 2015-042762, filed on Mar. 4, 2015, the contents of which are incorporated by reference herein in its entirety.

BACKGROUND

1. Technical Field

The present disclosure relates to a display device.

2. Description of the Related Art

Display devices including a curved display panel have been known (for example, Japanese Patent Application Laid- open Publication No. 2009-86560). This type of display device is called a curved display. The display panel is made using a thin film substrate. The display panel is bonded to a curved covering member for protecting a display surface. Display on a curved surface is implemented by the display panel bonded to the curved covering member.

The substrate is thinned so as to easily follow the curved surface of the covering member. However, when the substrate is formed thin, the mechanical strength of the substrate decreases, so that the substrate may be easily damaged by an unintended impact.

For example the display panel is made using a substrate including a pixel portion and a terminal portion. A flexible printed circuit board (hereinafter, abbreviated as "FPC" in some cases) is electrically coupled to a first surface of the substrate to which the terminal portion is provided. A polarizing plate is bonded to a second surface of a substrate facing the pixel portion. The display panel is bonded to the covering member in a state in which the polarizing plate faces the covering member.

In this configuration, at least a gap corresponding to the thickness of the polarizing plate is formed between the terminal portion and the covering member. Therefore, a thin substrate is located alone outside the polarizing plate, so that there is a possibility that the substrate is damaged by a stress generated when the FPC is pulled around.

SUMMARY

According to an aspect, a display device includes: a substrate including a pixel portion and a terminal portion that are provided on a first surface of the substrate, a flexible printed circuit board that is bonded to the terminal portion, a polarizing plate that is bonded to a region facing the pixel portion in a second surface opposite to the first surface of the substrate, a support member that is bonded to a region facing the terminal portion in the second surface, and a covering member that is bonded to the polarizing plate and the support member.

DETAILED DESCRIPTION

Figure 1:
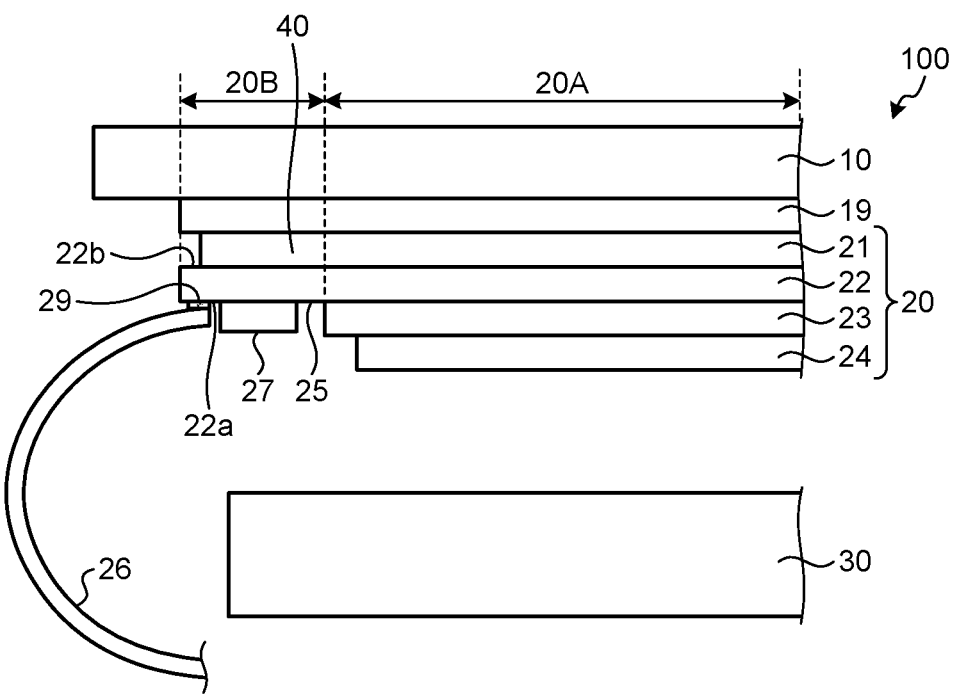
FIG. 1 is a cross-sectional view of a display device according to a first embodiment.

Embodiments for implementing the present invention will be described in detail with reference to the drawings.

The present invention is not limited by contents described in the embodiments described below. The components described below include components that can be easily assumed by those skilled in the art and component that are substantially the same. Further, the components described below can be arbitrarily combined. This disclosure is merely an example, and the scope of the preset invention naturally includes those which are related to appropriate changes while maintaining the gist of the present invention and which are easily assumed by those skilled in the art. The drawings may be schematically represented to make the description more accurate regarding the width, the thickness, the shape, and the like as compared with the actual forms.

However, the drawings are merely examples and do not limit the interpretation of the present invention. In the present specification and the drawings, the same elements as those that have been already described related to a drawing that has already been described may be denoted by the same reference numerals, and detailed descriptions thereof may be appropriately omitted.

First Embodiment

Figure 2:
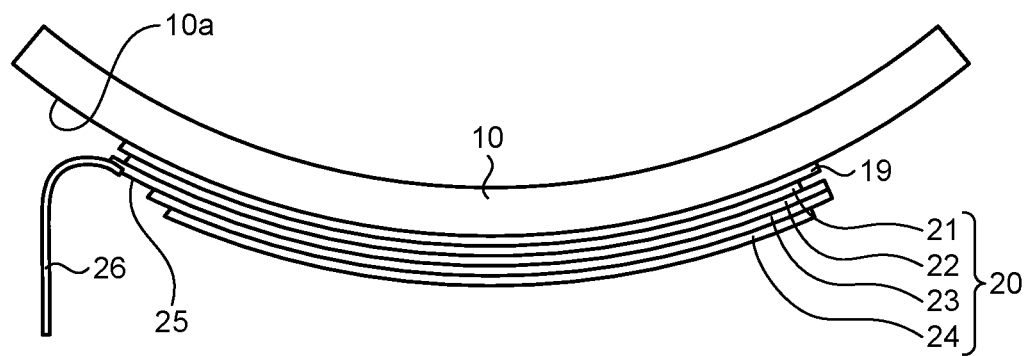
FIG. 2 is a cross-sectional view of a display panel and a covering member in a case in which the display device is configured as a curved surface display.
Figure 3:
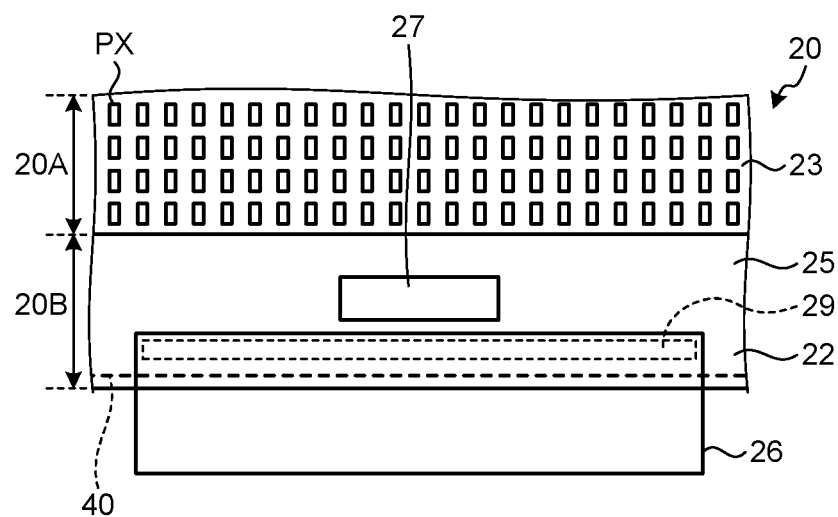
FIG. 3 is a plan view illustrating a vicinity of a terminal portion of the display device.

FIG. 1 is a cross-sectional view of a display device 100 according to a first embodiment of the present invention. FIG. 2 is a cross-sectional view of a display panel 20 and a covering member 10 in a case in which the display device 100 is configured as a curved surface display. FIG. 3 is a plan view illustrating a vicinity of a terminal portion 20B of the display device 100.

As illustrated in FIG. 1, the display device 100 includes the covering member 10, the display panel 20, an FPC 26, an IC (Integrated Circuit) chip 27, and a backlight 30.

The display panel 20 includes a first polarizing plate 21, a first substrate 22, a second substrate 23, and a second polarizing plate 24. The second substrate 23 is provided to face the first substrate 22. A liquid crystal layer (not illustrated in FIG. 1) is provided between the first substrate 22 and the second substrate 23. The first polarizing plate 21 is provided on a surface of the first substrate 22 opposite to the second substrate 23. The second polarizing plate 24 is provided on a surface of the second substrate 23 opposite to the first substrate 22.

The first substrate 22 includes a projection portion 25 that projects outside the second substrate 23. The projection portion 25 is provided with the terminal portion 20B (see FIG. 3). The IC chip 27 and the FPC 26 are electrically coupled to the terminal portion 20B. As illustrated in FIGS. 1 and 3, a pixel portion 20A and the terminal portion 20B are provided on a first surface 22a of the first substrate 22 (a surface facing the second substrate 23). A plurality of pixels PX are provided to the pixel portion 20A in a matrix form. The pixel portion 20A is electrically coupled to a plurality of external terminals (not illustrated in the drawings) provided to the terminal portion 20B. A region in the first surface 22a facing the second substrate 23 is a region that the pixel portion 20A is formed. A region in the first surface 22a projecting from the second substrate 23 is a region that the terminal portion 20B is formed.

The FPC 26 is bonded to the terminal portion 20B through a conductive bonding layer 29. The IC chip 27 is electrically coupled to the terminal portion 20B by flip-chip mounting.

As illustrated in FIG. 1, the backlight 30 is provided facing the display panel 20. The backlight 30 irradiates the display panel 20 with light. The display panel 20 modulates the light irradiated from the backlight 30 to form an image. As the backlight 30, it is possible to employ either one of an edge light method and a direct type method.

The covering member 10 is bonded to a display surface of the display panel 20 (a surface opposite to the backlight 30) with a bonding layer 19. The covering member 10 is a transparent substrate such as, for example, a glass substrate and a plastic substrate, which can transmit visible light. The covering member 10 transmits the light modulated by the display panel 20. As illustrated in FIG. 2, the covering member 10 has a curved surface portion 10a that is curved. The display panel 20 is bonded to the curved surface portion 10a in a state in which the display panel 20 is curved along the curved surface portion 10a. The covering member 10 protects the display surface of the display panel 20 and keeps the display panel 20 in a curved shape.

Members constituting the display panel 20 are thinned so as to easily follow the curved surface shape of the curved surface portion 10a. For example, the first substrate 22 and the second substrate 23 are respectively glass substrates having a thickness of 50 μm to 200 μm.

When the first substrate 22 and the second substrate 23 are thinned, the mechanical strength of the first substrate 22 and the second substrate 23 decreases, so that the first substrate 22 and the second substrate 23 may be easily damaged by an unintended impact. In particular, the projection portion 25 is pulled along with the FPC 26 when the FPC 26 is electrically coupled to another electronic component, so that the projection portion 25 is easily damaged.

Therefore, as illustrated in FIGS. 1 and 3, in the present embodiment, the first substrate 22 is arranged closer to the covering member 10 than the second substrate 23, and the projection portion 25 is fixed on the covering member 10 through a support member 40. The first polarizing plate 21 is bonded to a region facing the pixel portion 20A on a second surface 22b (the opposite surface of the first surface 22a) of the first substrate 22. The support member 40 is bonded to a region facing the terminal portion 20B on the second surface 22b. The covering member 10 is bonded to the first polarizing plate 21 and the support member 40. The first substrate 22 is bonded to the curved surface portion 10a through the first polarizing plate 21 and the support member 40. The projection portion 25 is supported by the support member 40 and the covering member 10. Therefore, the mechanical strength of the projection portion 25 increases, so that the projection portion 25 is hard to be damaged.

The support member 40 is bonded to a region on the second surface 22b facing the conductive bonding layer 29. Thereby, when the FPC 26 is pulled, the projection portion 25 is prevented from being bent. The projection portion 25 is prevented from being damaged by impact generated when the FPC 26 is bonded to the terminal portion 20B. The support member 40 is bonded to a region on the second surface 22b facing the IC chip 27. Thereby, the projection portion 25 is prevented from being damaged by impact generated when the IC chip 27 is mounted on the terminal portion 20B. The thickness of the support member 40 is the same as the thickness of the first polarizing plate 21. Thereby, bending based on a difference of thickness between the support member 40 and the first polarizing plate 21 is hard to occur in the projection portion 25.

The configuration of the support member 40 is arbitrary. The support member 40 may be provided separately from the first polarizing plate 21 or may be provided integrally with the first polarizing plate 21. In the present embodiment, the support member 40 is provided integrally with the first polarizing plate 21. The first polarizing plate 21 is provided so as to extend over a region facing the pixel portion 20A and a region facing the terminal portion 20B. The first polarizing plate 21 provided to the region facing the terminal portion 20B is configured as the support member 40.

Figure 4:
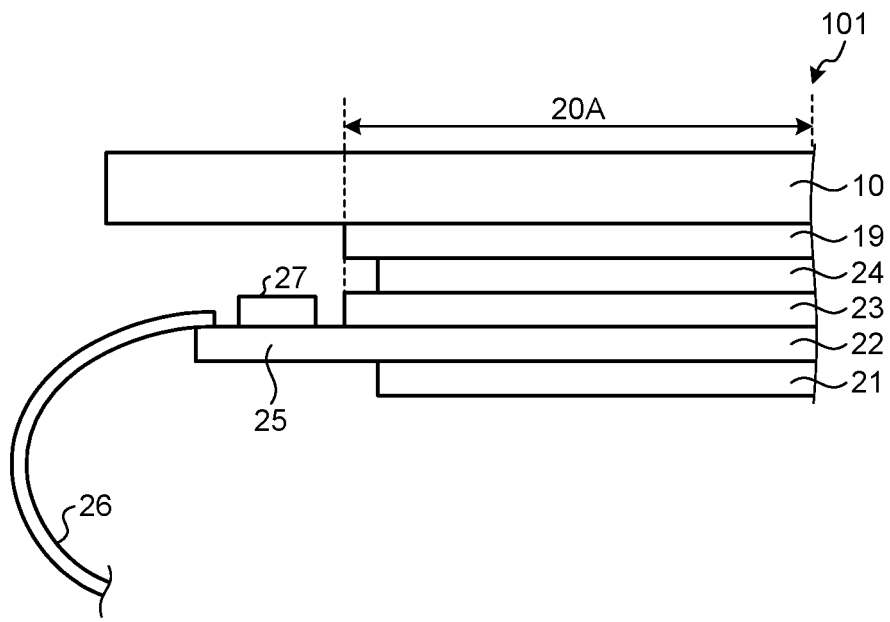
FIG. 4 is a cross-sectional view of a display device according to a comparative example.
Figure 5:
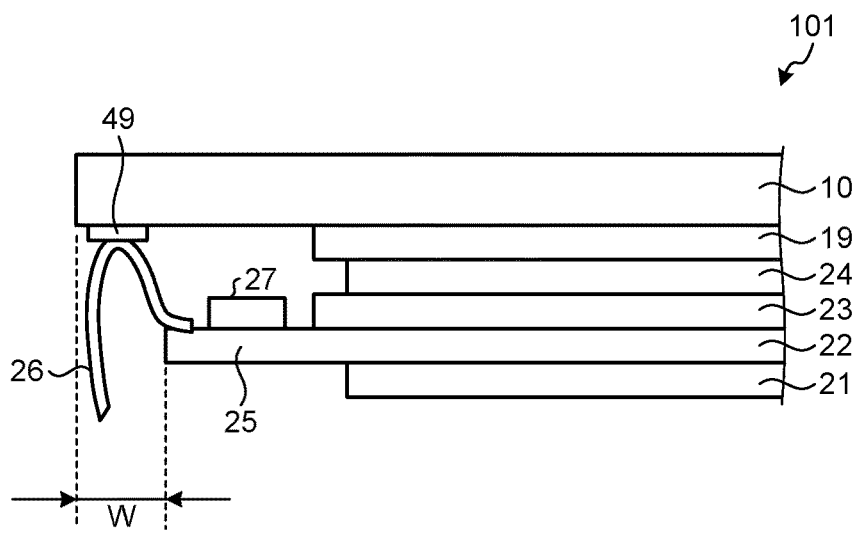
FIG. 5 is a cross-sectional view of a display device according to a comparative example.

The effects of the display device 100 described above will be described in comparison with a display device 101 illustrated in FIGS. 4 and 5. FIGS. 4 and 5 are cross-sectional views of the display device 101. Components of the display device 101 common to those of the display device 100 are denoted by the same reference numerals.

The display device 101 is different from the display device 100 in that the first polarizing plate 21 is formed smaller than the second substrate 23 and in that the second substrate 23 is arranged closer to the covering member 10 than the first substrate 22. In the display device 101, a gap corresponding to a total thickness of at least the second substrate 23 and the second polarizing plate 24 is formed between the projection portion 25 and the covering member 10. Therefore, the thin projection portion 25 exists alone. Thus, there is a possibility that the projection portion 25 is damaged by a stress generated when the FPC 26 is pulled around.

As illustrated in FIG. 5, it can be considered to fix a part of the FPC 26 to the covering member 10 with a bonding layer 49. However, when the FPC 26 is bent toward the covering member 10, a force to cancel the bending is applied to the projection portion 25, so that there is a possibility that the projection portion 25 is damaged. When the FPC 26 is bent gently, the force becomes small. However, a width W of a bent portion increases, so that it is difficult to reduce the size of (narrow a frame of) the device.

On the other hand, in the display device 100 of the present embodiment, the first substrate 22 is arranged closer to the covering member 10 than the second substrate 23, and the projection portion 25 is fixed on the covering member 10 through a support member 40. Therefore, the projection portion 25 is supported by the support member 40 and the covering member 10, so that the mechanical strength of the projection portion 25 increases. Thus, even when a method as illustrated in FIG. 5 is not applied, it is possible to prevent the projection portion 25 from being damaged. Hence, a display device is provided which has a narrow frame and is hard to be damaged. When the first substrate 22 is bonded to the curved surface portion 10a, the first substrate 22 has to be bent along the curved surface portion 10a. However, the first substrate 22 is supported by the first polarizing plate 21 and the support member 40, so that the first substrate 22 is hard to be damaged.

Second Embodiment

Figure 6:
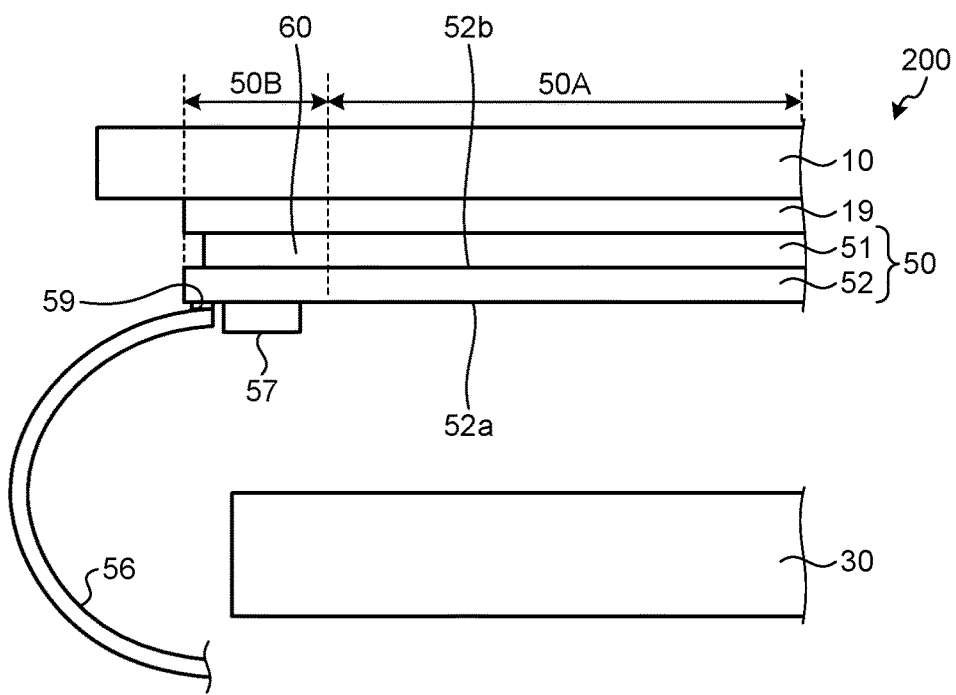
FIG. 6 is a cross-sectional view of a display device according to a second embodiment.

FIG. 6 is a cross-sectional view of a display device 200 according to a second embodiment of the present invention. In the present embodiment, components common to those in the first embodiment are denoted by the same reference numerals and the detailed description is omitted.

The display device 200 includes a covering member 10, a display panel 50, an FPC 56, and an IC chip 57. The display panel 50 includes a polarizing plate 51 and a substrate 52. A pixel portion 50A and a terminal portion 50B are provided to a first surface 52a of the substrate 52. A plurality of pixels are provided to the pixel portion 50A in a matrix form. An organic EL element is provided to each pixel as a display element. If necessary, a sealing substrate (not illustrated in the drawings) that seals the pixel portion 50A is provided to the first surface 52a. The pixel portion 50A is electrically coupled to a plurality of external terminals (not illustrated in the drawings) provided to the terminal portion 50B. The FPC 56 is bonded to the terminal portion 50B with a conductive bonding layer 59. The IC chip 57 is electrically coupled to the terminal portion 50B by flip-chip mounting.

The covering member 10 is bonded to a display surface (a second surface 52b opposite to the first surface 52a) of the display panel 50 with a bonding layer 19. The covering member 10 transmits light irradiated from the organic EL element of the pixel portion 50A. As illustrated in FIG. 2, the covering member 10 has a curved surface portion 10a that is curved. The display panel 50 is bonded to the curved surface portion 10a in a state in which the display panel 50 is curved along the curved surface portion 10a. The covering member 10 protects the display surface of the display panel 50 and keeps the display panel 50 in a curved shape. Members constituting the display panel 50 are thinned so as to easily follow the curved surface shape of the curved surface portion 10a. For example, the substrate 52 is a glass substrate having a thickness of 50 µm to 200 µm.

The polarizing plate 51 is bonded to a region facing the pixel portion 50A on the second surface 52b of the substrate 52. A support member 60 is bonded to a region facing the terminal portion 50B on the second surface 52b. The covering member 10 is bonded to the polarizing plate 51 and the support member 60. The substrate 52 is bonded to the curved surface portion 10a through the polarizing plate 51 and the support member 60. A portion of the substrate 52 where the terminal portion 50B is provided is supported by the support member 60 and the covering member 10. Therefore, the mechanical strength of the portion of the substrate 52 where the terminal portion 50B is provided increases, so that the portion is hard to be damaged.

The support member 60 is bonded to a region on the second surface 52b facing the conductive bonding layer 59. Thereby, when the FPC 56 is pulled, the portion of the substrate 52 where the terminal portion 50B is provided is prevented from being bent. The substrate 52 is prevented from being damaged by impact generated when the FPC 56 is bonded to the terminal portion 50B. The support member 60 is bonded to a region on the second surface 52b facing the IC chip 57. Thereby, the substrate 52 is prevented from being damaged by impact generated when the IC chip 57 is mounted on the terminal portion 50B. The thickness of the support member 60 is the same as the thickness of the polarizing plate 51. Thereby, bending based on a difference of thickness between the support member 60 and the polarizing plate 51 is hard to occur in the portion of the substrate 52 where the terminal portion 50B is provided.

The configuration of the support member 60 is arbitrary. The support member 60 may be provided separately from the polarizing plate 51 or may be provided integrally with the polarizing plate 51. In the present embodiment, the support member 60 is provided integrally with the polarizing plate 51. The polarizing plate 51 is provided so as to extend over a region facing the pixel portion 50A and a region facing the terminal portion 50B. The polarizing plate 51 provided to the region facing the terminal portion 50B is configured as the support member 60.

Therefore, also in the present embodiment, the display device 200 is provided in which the substrate 52 is hard to be damaged.

What is claimed is:

1. A display device comprising:
    a substrate having a first surface and a second surface, the first surface including a pixel portion and a terminal portion, and the second surface being opposite to the first surface and facing an observer's side;
    a flexible printed circuit board that is electrically coupled to the terminal portion;
    a polarizing plate that is bonded to the second surface in a region facing the pixel portion;
    a support member that is bonded to the second surface in a region facing the terminal portion; and
    a covering member that is bonded to the polarizing plate and the support member,
    wherein
    on the first surface of the substrate in the terminal portion, one end of the flexible printed circuit board is disposed, and
    on the second surface of the substrate, a layer including the support member and the polarizing plate is disposed.

2. The display device according to claim 1, wherein
    the polarizing plate is provided so as to extend over a region facing the pixel portion and a region facing the terminal portion, and
    the polarizing plate provided to the region facing the terminal portion is configured as the support member.

3. The display device according to claim 1, wherein
    the flexible printed circuit board is bonded to the terminal portion with a conductive bonding layer, and
    the support member is bonded to a region of the second surface facing the conductive bonding layer.

4. The display device according to claim 1, wherein
    an IC chip is electrically coupled to the terminal portion, and
    the support member is bonded to a region facing the IC chip in the second surface.

5. The display device according to claim 1, wherein a thickness of the support member is equal to a thickness of the polarizing plate.

6. The display device according to claim 1, wherein
    the covering member has a curved surface portion that is curved, and
    the substrate is bonded to the curved surface portion through the polarizing plate and the support member.

7. The display device according to claim 1, wherein the substrate is a glass substrate having a thickness of 50 µm to 200 µm.

8. The display device according to claim 1, wherein the substrate and the layer including the support member and the polarizing plate are all curved along the covering member and bonded tightly to the covering member.

9. The display device according to claim 1, further comprising a backlight that is opposed to the substrate, wherein
    the backlight, the one end of flexible printed circuit board, the substrate, the layer including the support member and the polarizing plate, and the covering member are provided in that order.

10. The display device according to claim 1, wherein the terminal portion of the substrate is fixed to the covering member through the support member.

* * * * *